United States Patent
Chastan-Bagnis

[15] 3,695,441
[45] Oct. 3, 1972

[54] SELF-PROPELLED FLOATING DOCK AND SEPARATOR FILTER ASSEMBLY FOR TREATING POLLUTED WATER SURFACES AND NAUTICAL WORKS

[72] Inventor: Lucien Chastan-Bagnis, 21, Avenue Isola Bella, Cannes, France

[22] Filed: Aug. 10, 1970

[21] Appl. No.: 62,568

[52] U.S. Cl. .................................................. 210/242
[51] Int. Cl. .................................................. C02b 9/02
[58] Field of Search .......... 210/83, 242, DIG. 21, 523

[56] References Cited

UNITED STATES PATENTS

| | | |
|---|---|---|
| 3,268,081 | 8/1966 | Menkee et al. ............ 210/242 |
| 3,081,879 | 3/1963 | Schroeder et al. ......... 210/523 |
| 3,237,774 | 3/1966 | Schuback ........... 210/DIG. 21 |
| 3,219,190 | 11/1965 | Thune ....................... 210/242 |
| 1,591,024 | 7/1926 | Dodge ....................... 210/242 |
| 3,517,812 | 9/1967 | Bucchioni et al. ...210/DIG. 21 |

FOREIGN PATENTS OR APPLICATIONS 931,594 7/1963 Great Britain ...... 210/DIG. 21

Primary Examiner—Reuben Friedman
Assistant Examiner—T. A. Granger
Attorney—Raymond A. Robic

[57] ABSTRACT

There is provided a self-propelled enclosure for treating polluted water surfaces. It comprises two longitudinal caissons, a bottom floor and transverse partitions to connect the longitudinal caissons and to define the enclosure. A door is pivotally mounted at the front end of the floating enclosure and is downwardly foldable between a closed position of the enclosure, intermediate positions of the door and a fully opened position thereof in a plane which substantially coincides with the plane of the bottom floor. In this manner, the upper edge of the door can be at a predetermined depth under the water surfaces to enable polluted water to enter the enclosure. A vault is formed in the bottom floor to define a channel underneath the bottom floor and a motor-operated helix is disposed at the rear end of the channel to suck water in the channel so that upon downwardly folding the door at a level lying immediately beneath a polluting layer, the self-propelled enclosure will be seen to advance over water to cause the polluting layer to slowly enter the enclosure until it fills the same.

3 Claims, 2 Drawing Figures

PATENTED OCT 3 1972
3,695,441
FIG. 1
FIG. 2
INVENTOR
Lucien CHASTAN BAGNIS
ATTORNEY
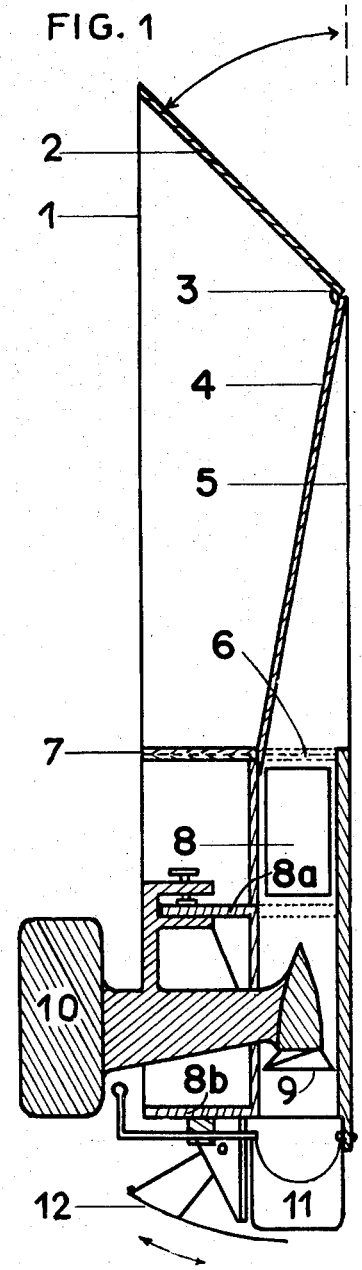
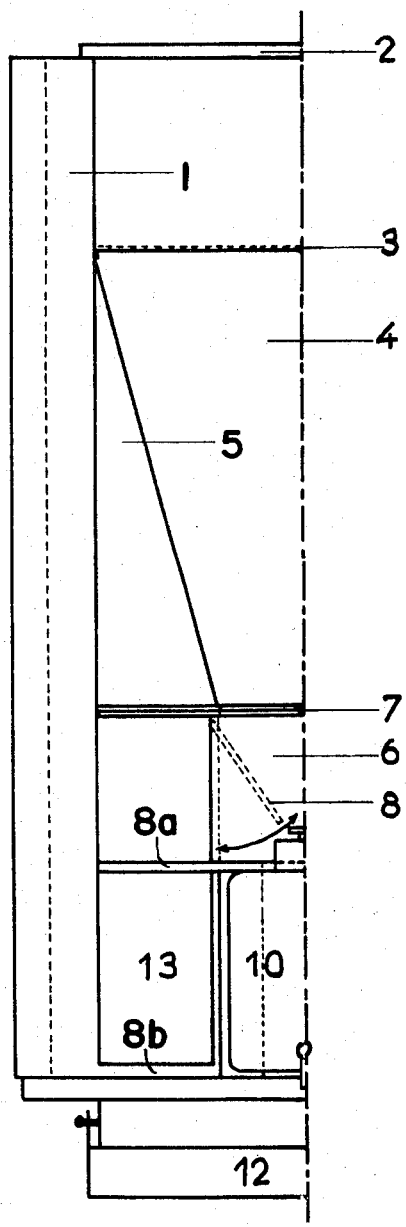

SELF-PROPELLED FLOATING DOCK AND SEPARATOR FILTER ASSEMBLY FOR TREATING POLLUTED WATER SURFACES AND NAUTICAL WORKS

This invention relates to a self-propelled floating dock and separator-filter assembly adapted to be used for treating polluted water surfaces and nautical works. More particularly, the invention is mainly concerned with the cleaning of water surfaces which are polluted as a result of pouring therein hydrocarbons or garbage which float in the vicinity of the water surface.

The device according to the invention may be used to clean muddy bottoms, to collect seaweeds, to draw sea water. Finally, because of its hydrostatic properties it can be used as a device for careening or for fighting fires.

In the treatment of water surfaces which are polluted by hydrocarbons the present state of the art is limited to the pouring of two types of products; first, those which bind the hydrocarbon into a floating mess, which one tries to collect at a later stage; second, those which form a precipitate which sends the hydrocarbon at the bottom, which means that there is a more or less complete destruction of the living organisms. Pumping operations carried out at the surface, and dragging with the intention of cleaning muddy bottoms are both slow, very costly and not too efficent. Since the water which is intended to be treated often has a large surface area, the use of pumps is nearly impossible because too much power would have to be used on the spot.

The device according to the present invention can move extremely large quantities of liquids such as water and hydrocarbons while using substantially reduced power outputs by merely creating a horizontal current within the fluid. Essentially, when a motor-operated helix is rotated in a fluid it creates a current. If an adjustable panel is disposed vertically and across the current in front of the helix, it would be possible to accumulate very little water but a lot of hydrocarbon behind the panel. The device according to the invention being essentially mobile and autonomous it could be very rapidly sent in the vicinity of a polluting layer, which it will attack by moving thereover. The only interruptions result from unloading which must necessarily be carried out at regular intervals.

In the drawings which illustrate the invention,

FIG. 1 is a vertical longitudinal section of the device according to the invention;

FIG. 2 is a half view taken from below.

Viewed from above, the device illustrated sits inside a rectangle; its transversal section is an isosceles trapeze in which the shorter base is the bottom. Two floaters 1 extend along the whole length of the lateral sides of the device, and these floaters 1 could be filled with water or emptied at will be means of pumps or compressed air. The front portion of the device comprise a door 2, which is rotable about the axis 3 in order to close the space between the bottom 5 of the device, and the floaters, 1 in the raised position of the door 2. Eventually, when the door 2 is lowered down, it can reach the horizontal position. A prismatic type of inclined vault in the form of an open three-sided channel slowly rises from the axis of the door until it reaches the vicinity of the rear end of the device. The vault is identified by reference number 4. The vault 4 projects upwardly from the bottom 5 and defines a channel until the latter reaches a duct 6 which has a circular cross-section and in which a helix 9 is mounted. The bottom 5 also comprises shutters or flushing valves not illustrated in the drawings. In front of its opening and perpendicularly thereto, the duct 6 is covered with a filter 7 which occupies the entire remaining inner transversal section of the device. Towards the rear, behind the filter 7, the duct 6 comprises two vertically pivoting doors 8 which can be opened inwardly and used to flush the device after a filtration. Between the intermediate and upstanding transverse rear end partitions 8a and 8b, there is a motor 10 which is used to rotate the helix 9 inside the duct 6. To steer the device, there is a rudder 11, which is pivotally mounted at the rear end of duct 6. A half-circular notch can be used to fold the rudder against the rear board. In this way, it is possible to adapt a flexible handle to duct 6 for works being carried at the bottom: sucking of mud, production of a bed to facilitate the lifting of an inanimated body, sucking of water at large for thalassotherapy. In this case, the motor must rotate the helix 9 in the opposite direction. It could eventually be possible to stabilize the device by means of a screen 12 which is perpendicular to the axis of the device and for which the immersion can be regulated. All the controls can be mounted in and carried out by anyone of the two small compartments 13, provided on both sides of the motor 10.

The operation of the device according to the invention is as follows. The device is on top of the water, the door 2 is closed, and the device is then brought to a zone where water is polluted. The door 2 is lowered down in such a manner that the upper edge thereof lies immediately beneath the polluting water. The motor propels the device by sucking water in the channel and duct underneath the vault while causing the polluted liquid to enter the device and to slowly fill the compartment defined by the door 2, floaters 1 and the intermediate partition 8a. Once filling is over the door 2 is closed. The liquid which is now in the compartment defined by the floaters can be carried away, if the pollution results from the presence of hydrocarbons. If only debris are present, the liquid could be filtrated in the device according to the invention. For this purpose, the doors 8 are opened, and the motor is started. Since the doors rest against one another, the front portion of duct 6 is closed. Sucking can only be carried out through filter 7, where water is sent rearwardly of the filter and it than enters the duct 6 by the opening of the doors 8. The variations of the conductibility variations of polluted sea water can be measured between two electrodes and be used to automatically control the opening of the door 2, which is mounted at the front end of the device, as well as the doors 8 or the flushing valves. The apparatus which has been scribed can also serve to lift up small articles and can be used as a careening enclosure. The same operation can be carried out in the case of a fire aboard a small boat by protecting the latter from the risk of sinking when the pumps sent water over the fire.

The novelty of the device according to the invention resides mainly in the use of a strong current of water which is created in the vicinity of the surface by the motor operated helix. The motor has an average power output. The action of the current is carried out horizontally to permit a separation of fluids or foreign debris. The means currently used are those supplied on an industrial basis. The device according to the invention will necessarily be small and could be incorporated in the standard equipment of a harbour. If there is a high level of pollution of the sea close to the a coast, a large number of these devices could be used to rapidly free the surface of the sea water from floating hydrocarbons.

I claim:

1. A self-propelled floating device for removing pollution from water surfaces which device comprises, in combination:
   a. two longitudinal caissons which are substantially parallel and spaced from one another and having front and rear ends,
   b. a bottom floor extending between and joining the caissons at their lower portions,
   c. a first upstanding transverse partition extending between and secured to the rear ends of the caissons,
   d. a second upstanding transverse partition extending between and secured to the caissons adjacent the rear ends thereof and spaced from the first upstanding transverse partition so as to define a compartment therewith,
   e. a door pivotally mounted to the bottom floor adjacent the front end of the caissons for removing the pollution, which door is adapted to be adjustably pivotable between a fully closed position at which point it serves to define an enclosure with the caisson, the bottom floor and the second transverse partition, and a fully opened position at which point its surface is substantially coplanar with the surface of the bottom floor,
   f. a vault formed in the bottom floor and defining a three-sided, downwardly open upwardly inclined channel extending substantially from the front end of the caissons to the second upstanding transverse partition and a horizontal channel connected to and extending substantially from the inclined channel to the first partition,
   g. a motor with a helix mounted in the compartment with the helix being disposed within and enclosed by the horizontal channel such that the operation of the motor will cause the helix to rotate and create a strong current of water which is drawn into and through both the inclined and horizontal channels, thereby causing the device to move forward such that the door serves to remove the pollution from the water surface and collect same within the enclosure.

2. The device of claim 1 further including:
   a. a filter disposed within the enclosure between the second transverse partition and the door,
   b. a pair of openings formed in the walls of the channel,
   c. a pair of pivotal doors adapted to close off the openings such that when the doors are in their open position and the motor is in operation, the pollution is separated by the filter from any water collected therewith and the water is caused to pass into the openings and out through the channel.

3. The device of claim 1 wherein the portion of the channel enclosing the helix is in the form of a duct having a circular cross-section.

* * * * *

UNITED STATES PATENT OFFICE
CERTIFICATE OF CORRECTION

Patent No. 3,695,441  Dated October 3, 1972

Inventor(s) Lucien Chastan-Bagnis

It is certified that error appears in the above-identified patent and that said Letters Patent are hereby corrected as shown below:

Title Page, Left Column, between lines 11 and 12, insert

--[30] Foreign Application Priority Data    October 21, 1969

France PV No. 6937029--

Signed and Sealed this eleventh Day of May 1976

[SEAL]

Attest:

RUTH C. MASON
Attesting Officer

C. MARSHALL DANN
Commissioner of Patents and Trademarks